(No Model.)
F. CARRIER.
HASHING OR MASTICATING IMPLEMENT.
No. 550,483. Patented Nov. 26, 1895.
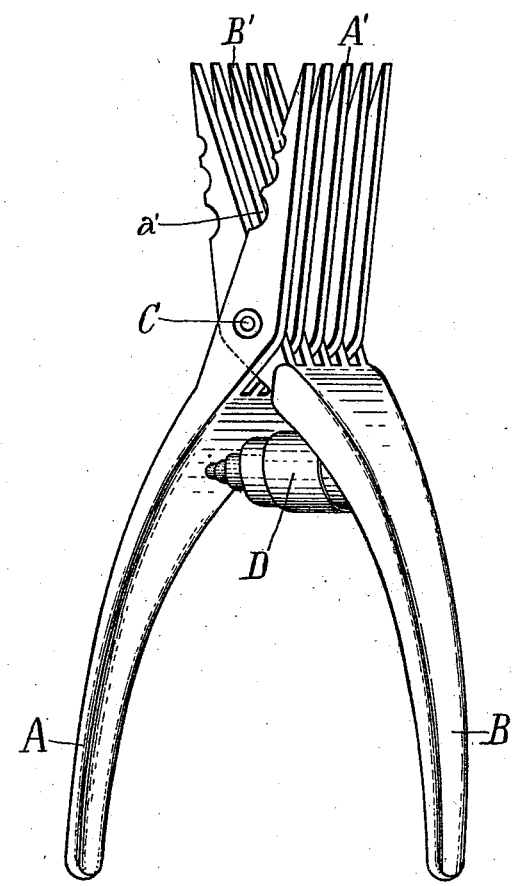

UNITED STATES PATENT OFFICE.

FELIX CARRIER, OF GENEVA, SWITZERLAND.

HASHING OR MASTICATING IMPLEMENT.

SPECIFICATION forming part of Letters Patent No. 550,483, dated November 26, 1895.

Application filed May 24, 1895. Serial No. 550,491. (No model.)

*To all whom it may concern:*

Be it known that I, FELIX CARRIER, gentleman, residing at Geneva, Switzerland, have invented a certain new and useful Improved Hashing or Masticating Implement, of which the following is a specification.

This invention consists of an implement principally intended to be used by people having defective teeth, with a view of hashing or masticating by hand at table those aliments which necessitate such mastication.

The same apparatus may be used in the kitchen in place of the well-known hashing-machines, with a view of preparing the meat for the cooking.

My improved hashing implement will be very useful for sick or old people and for travelers.

The accompanying drawing represents in a perspective view my improved implement, the form or shape of which, as well as its dimensions and the materials of which it is made, being varied at will.

My improved hashing or masticating implement is formed of two handles A and B, hinged to one another at C and having their upper ends joined, with ranges of cutting-plates like a comb, and the plates of one of these combs A' passing between those of the other comb B', as seen in the drawing. The plates of the comb A' are formed so as to fill out the space between two plates of the comb B', and vice versa, and their edges are sharp, so that if a piece of meat or other aliment is acted upon between the ranges of plates A' and B' it will be hashed to pieces by the sharp edges of the combs and pressed by the plates of one of the said combs through the slots of the other one if the handles A and B are pressed the one toward the other. There is further provided a spring D, which is intended to reopen the tool after the handles of the same have been pressed the one toward the other. The implement may further be provided with a latch or other device to hold the parts closed when not in use.

The plates of the combs A' and B' will generally be provided with one or more ranges of notches a' for preventing the aliment acted upon by the combs sliding along the said teeth instead of being seized and cut off by the same.

The number of the plates of each comb may vary at will, and the handles may be of any suitable shape and provided with suitable designs or other ornaments.

Having thus fully described my invention, I claim—

1. The herein described improved hashing or masticating implement, consisting of two sets of crossing plates pivoted together, the plates in one set closely filling the spaces between the plates in the other set and having square cutting edges and handles integral with such sets of plates, substantially as specified.

2. The herein described improved hashing or masticating implement consisting of two sets of crossing plates pivoted together, the plates in one set closely filling the spaces between the plates in the other set and the cutting edges in one set of plates being notched, and handles connected with such sets of plates, substantially as specified.

In testimony whereof I have signed my name to this specification in the presence of two subscribing witnesses.

FELIX CARRIER.

Witnesses:
E. IMER SCHNEIDER,
ERL. PAGNARD.